(12) United States Patent
Shirk et al.

(10) Patent No.: US 7,114,984 B2
(45) Date of Patent: Oct. 3, 2006

(54) LEVER STYLE DE-LATCH MECHANISM FOR PLUGGABLE ELECTRONIC MODULE

(75) Inventors: Michael E. Shirk, Grantville, PA (US); Michael D. Long, Hummelstown, PA (US); Michael J. Phillips, Camphill, PA (US); William J. Schnoor, Middletown, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/804,637

(22) Filed: Mar. 19, 2004

(65) Prior Publication Data

US 2005/0003696 A1 Jan. 6, 2005

Related U.S. Application Data

(63) Continuation-in-part of application No. 10/308,743, filed on Dec. 4, 2002, now Pat. No. 6,805,573.

(60) Provisional application No. 60/456,361, filed on Mar. 22, 2003.

(51) Int. Cl.
*H01R 13/62* (2006.01)
(52) U.S. Cl. .................. 439/372; 439/157; 439/352
(58) Field of Classification Search ............. 439/157, 439/266, 352, 152, 153, 155, 159, 160, 372
See application file for complete search history.

(56) References Cited

U.S. PATENT DOCUMENTS

| | | | | |
|---|---|---|---|---|
| 4,343,524 A | * | 8/1982 | Bright et al. | 439/268 |
| 4,887,974 A | * | 12/1989 | Ichimura et al. | 439/259 |
| 6,439,918 B1 | * | 8/2002 | Togami et al. | 439/372 |
| 6,556,445 B1 | * | 4/2003 | Medina | 361/728 |
| 6,644,991 B1 | * | 11/2003 | Martin | 439/157 |
| 6,805,573 B1 | * | 10/2004 | Phillips et al. | 439/352 |
| 6,824,416 B1 | * | 11/2004 | Di Mascio | 439/352 |
| 2005/0003696 A1 | * | 1/2005 | Shirk et al. | 439/352 |

* cited by examiner

*Primary Examiner*—James R. Harvey

(57) ABSTRACT

A lever-style de-latch mechanism for a pluggable electronic module, such as an SFP MSA fiber optic transceiver or other pluggable optoelectronic or electronic module. The mechanism is easily accessible to an operator and does not require any tools to operate. The mechanism uses rotational motion of a lever about a horizontal axis transverse to a horizontal direction of elongation of a module, or about a vertical axis (relative to a module extending in a horizontal plane), to cause translational motion of the de-latch actuator. Mechanisms including both T and bail latch style levers are provided. The lever may be adjacent to, or extend beyond, the front/face of the module's housing for tool-free accessibility and operation. The mechanism may allow the user to apply force to actuate the mechanism in a direction that does not oppose a withdrawal and/or module ejection force.

6 Claims, 21 Drawing Sheets

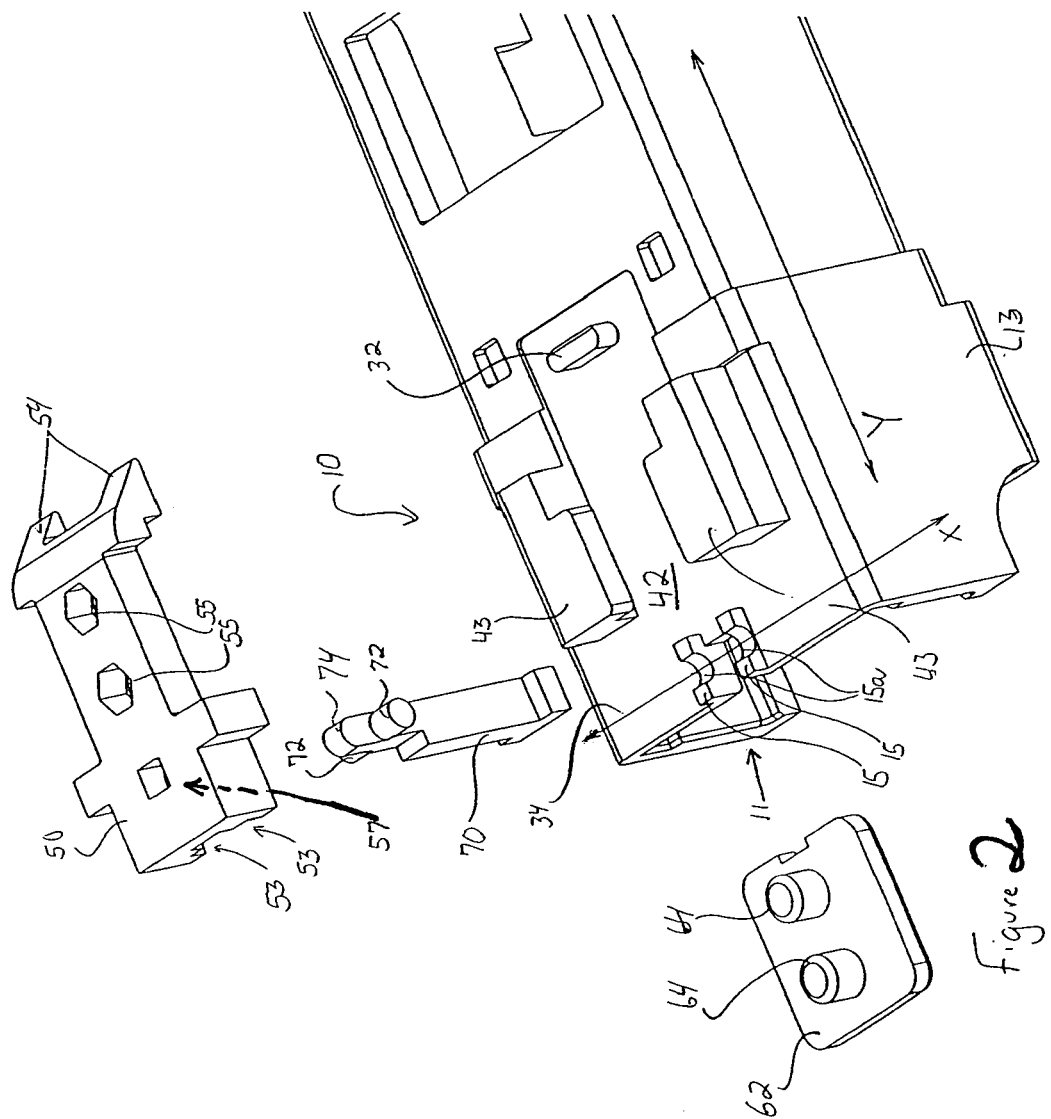

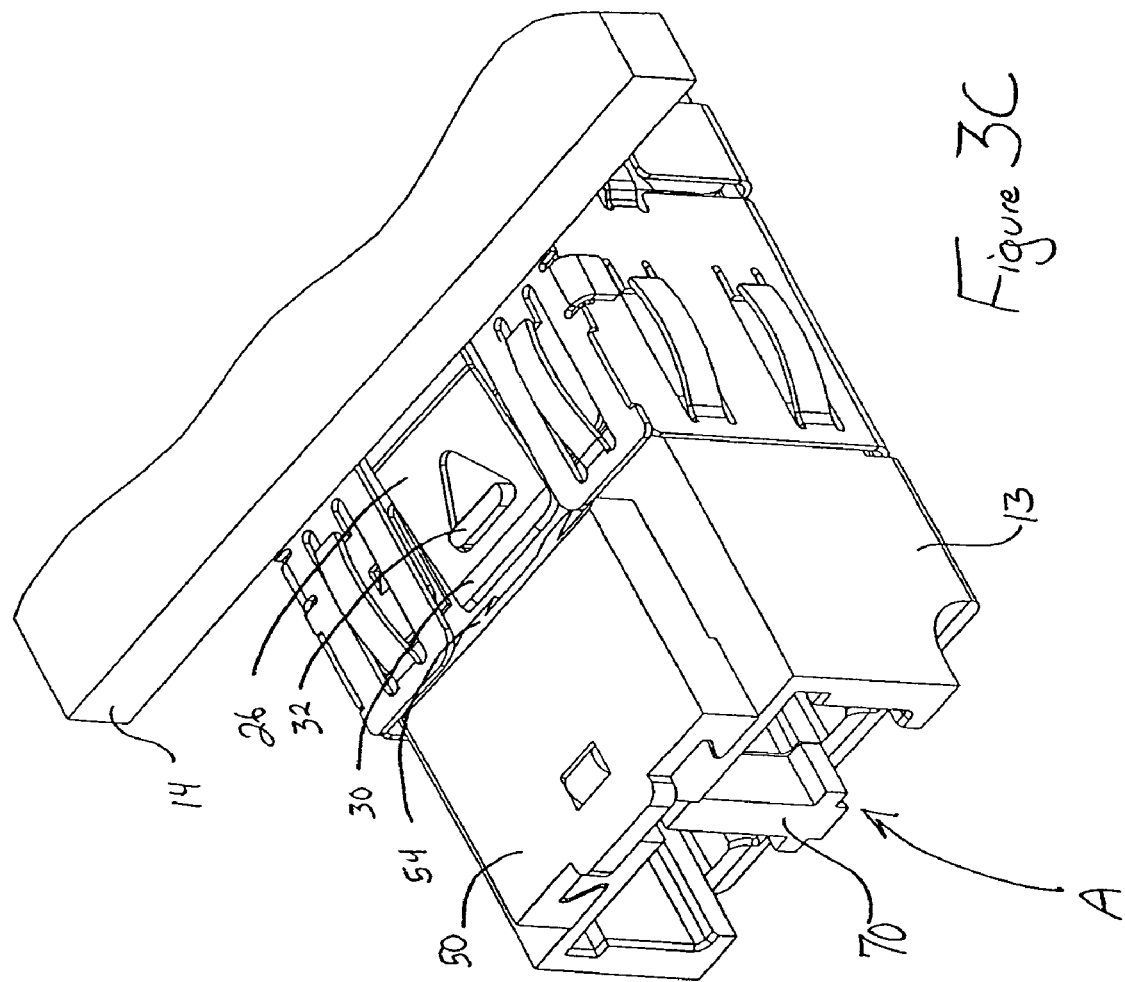

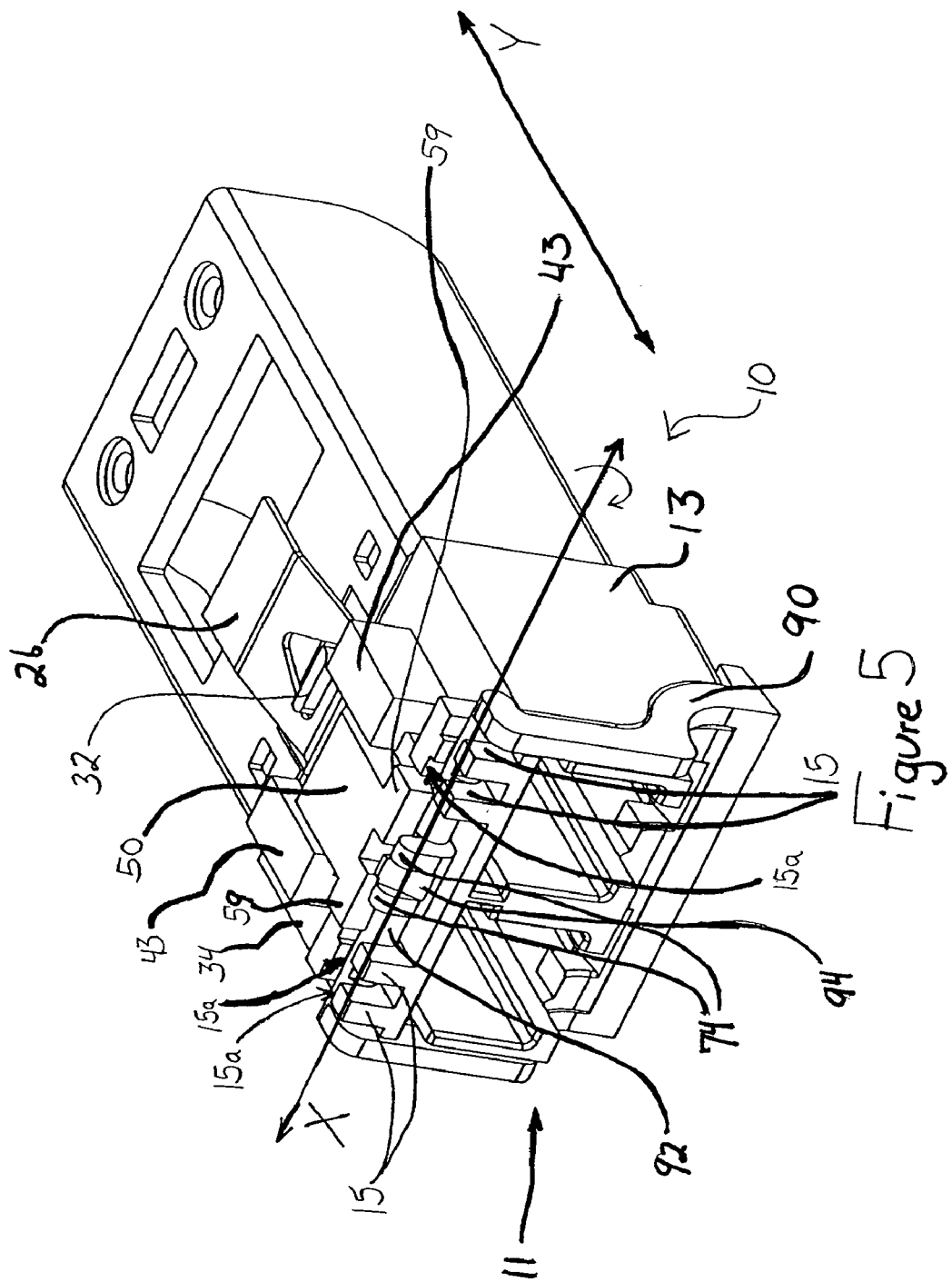

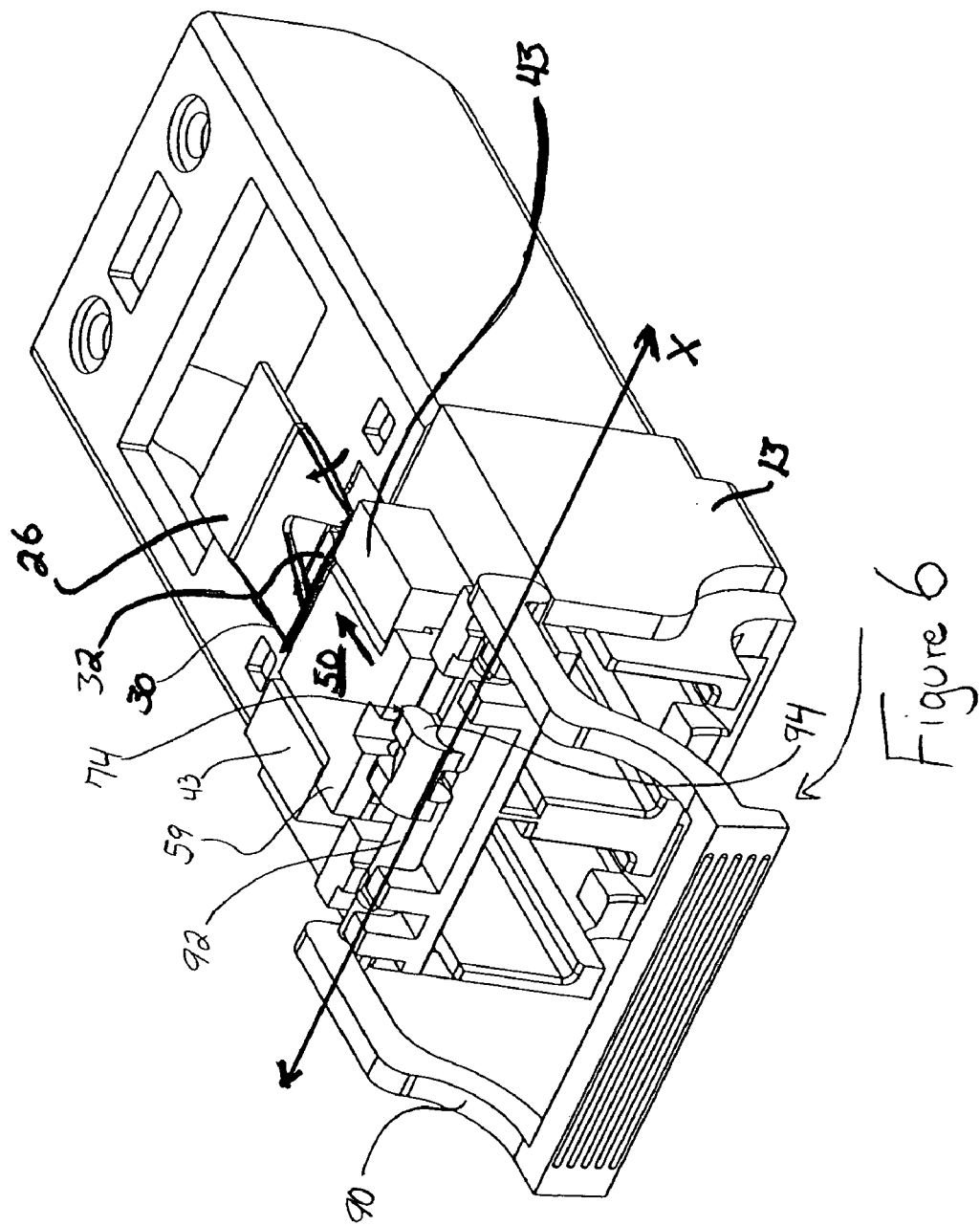

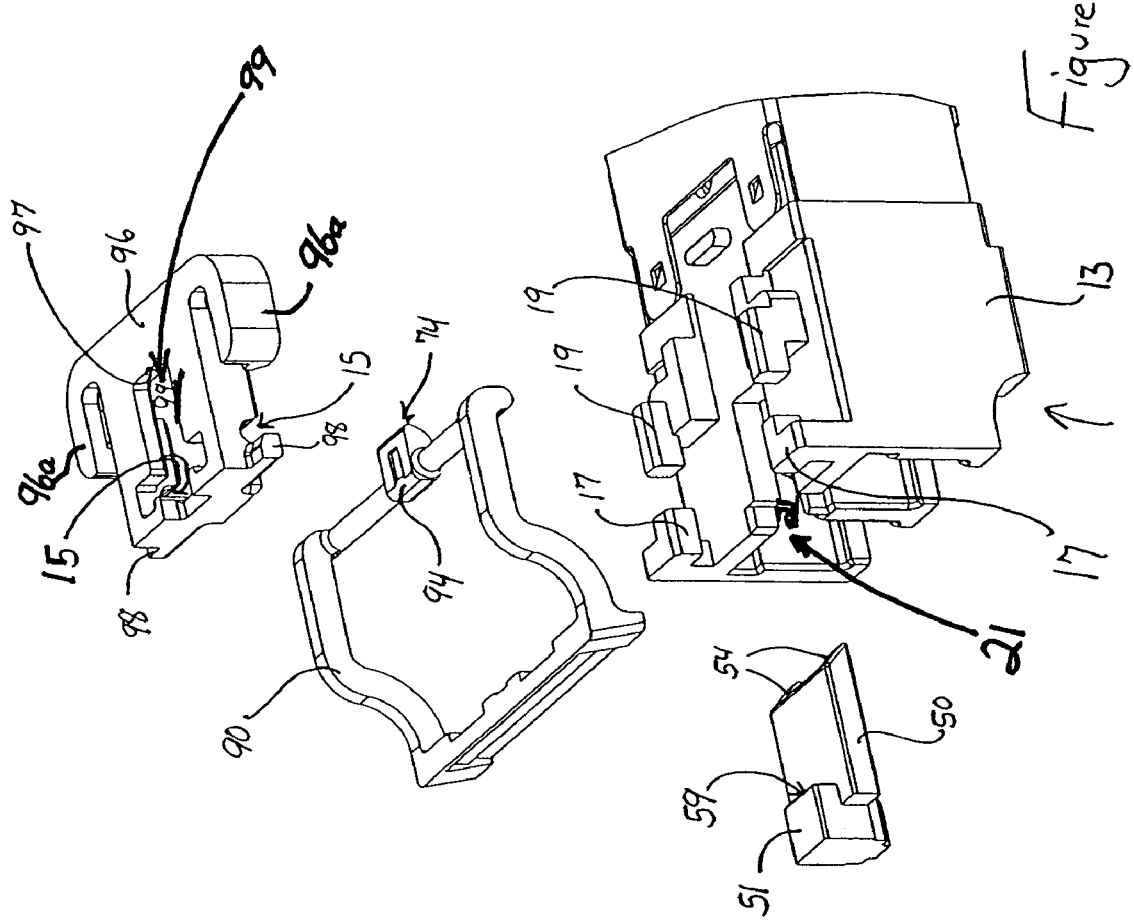

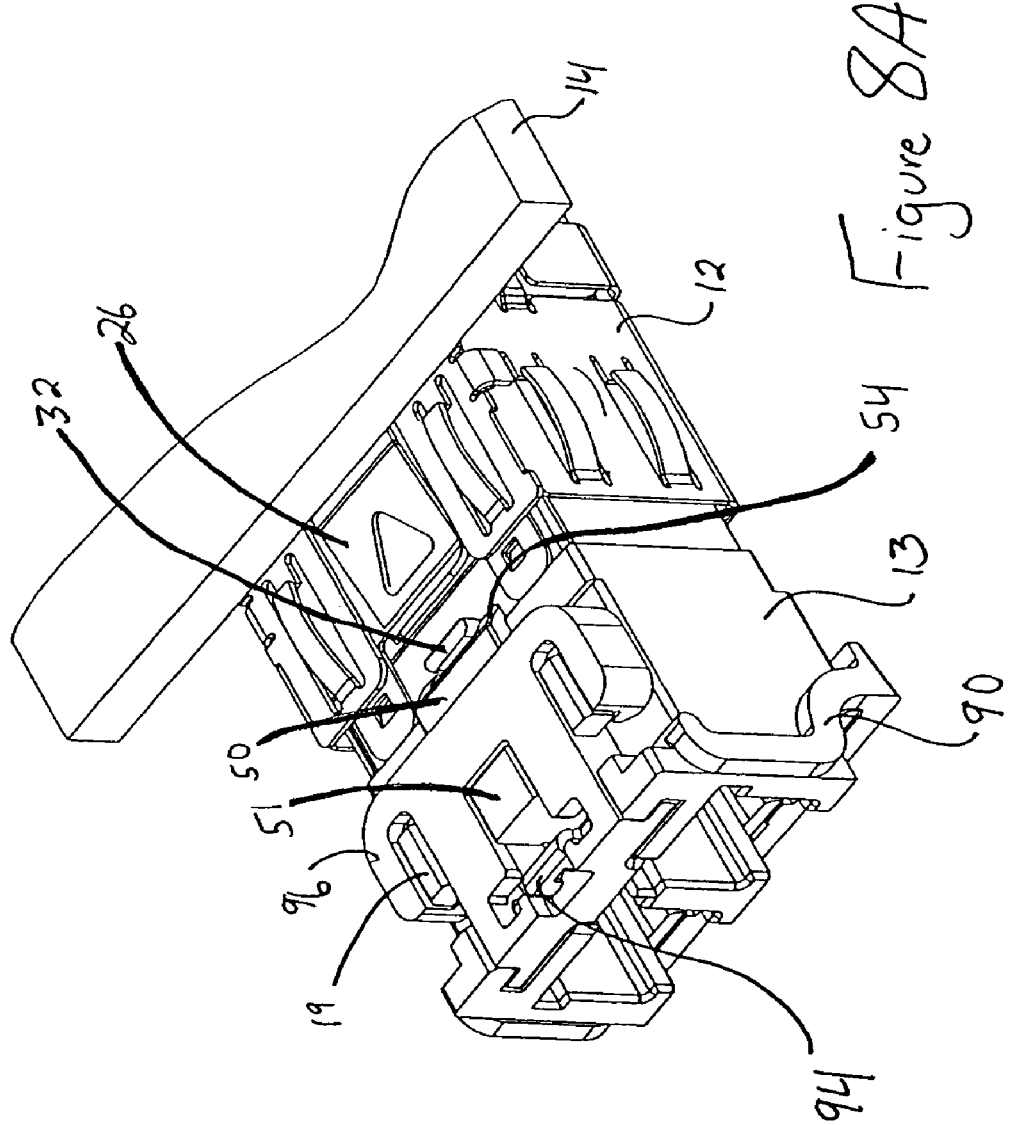

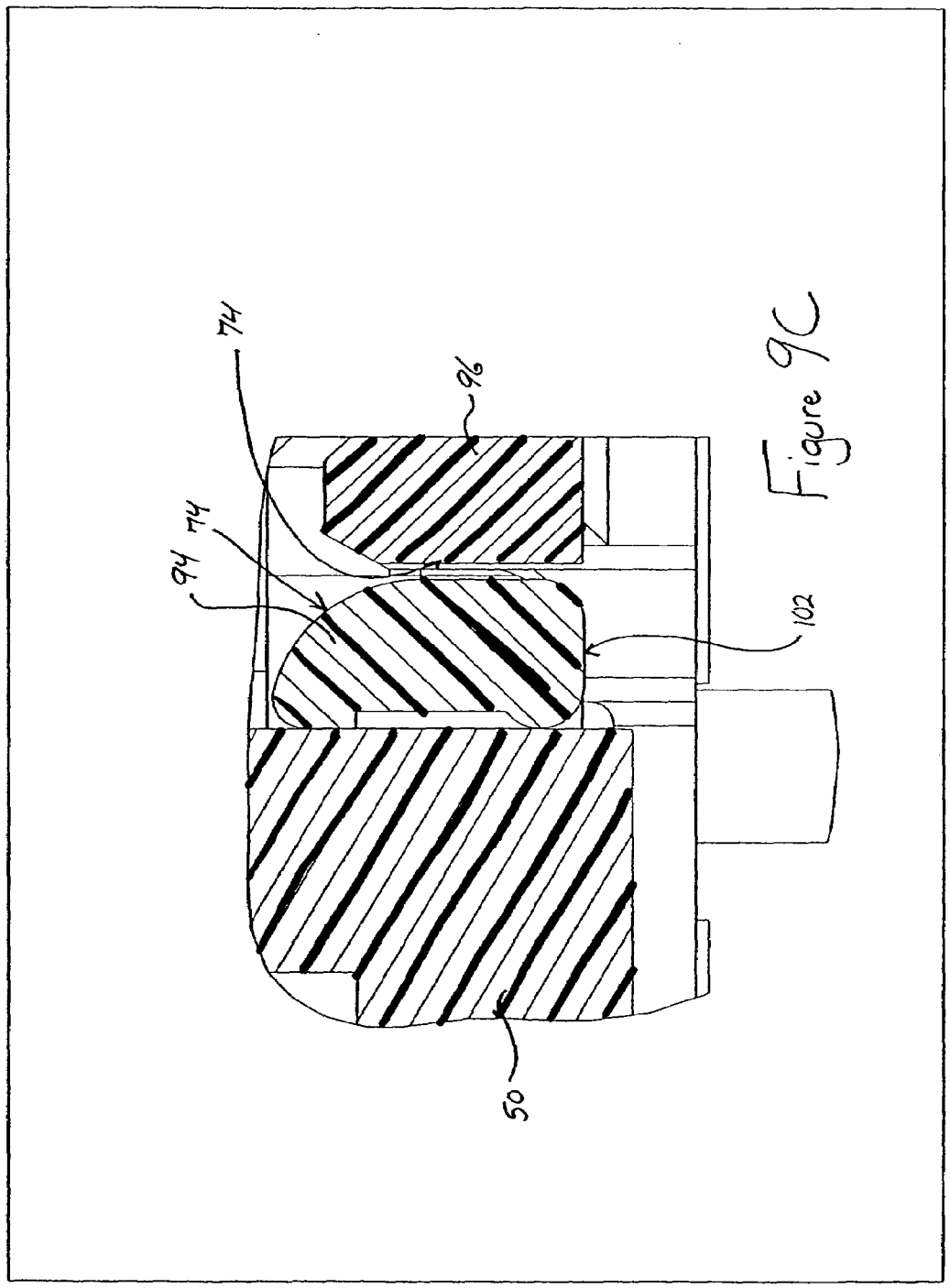

LEVER STYLE DE-LATCH MECHANISM FOR PLUGGABLE ELECTRONIC MODULE

CROSS-REFERENCE TO RELATED APPLICATIONS

This application claims the benefit of U.S. Provisional Patent Application No. 60/456,361, filed Mar. 22, 2003, and is a continuation-in-part of U.S. application Ser. No. 10/308,743, filed Dec. 4, 2002, the entire disclosures of both of which are hereby incorporated herein by reference.

FIELD OF THE INVENTION

The present invention relates generally to pluggable electronic modules, such as transceiver modules for high speed fiber optical communications, and, more specifically, to pluggable electronic modules having de-latch mechanisms for unlatching such modules from their receptacles.

BACKGROUND OF INVENTION

It has been known in the pertinent art to dispose electronic modules, particularly optoelectronic transceivers, in a pluggable manner on a printed-circuit board. Known in particular are pluggable transceivers of a small construction, known as Small Form-Factor Pluggable (SFP) transceivers. Standards for SFP transceivers are set forth in the "Small Form-Factor Pluggable (SFP) Transceiver Multisource Agreement (MSA)," dated Sep. 14, 2000, the disclosure of which is hereby incorporated herein by reference. Such transceivers are received in an SFP receptacle on the printed-circuit board. Infrared light is coupled into and out of the transceiver via a plug receptacle that is arranged on the transceiver or coupled to it and into which an optical connector can be plugged. U.S. Pat. Nos. 5,546,281, 5,717,533, 5,734,558, 5,864,468, 5,879,173 and 6,517,382 B2 which disclose exemplary optoelectronic transceivers, are hereby fully incorporated herein by reference.

FIG. 1A shows an exemplary transceiver module 10, receptacle 12, and printed circuit board (PCB) 14 of a type generally known in the art, as discussed in detail in U.S. Pat. No. 6,517,382 B2. The receptacle 12 is mounted to the PCB 14 and is preferably constructed of a conductive metal. Contacts 20 ground the receptacle 12 to a stacked array (not shown). The module 10 of FIG. 1A is shown partially inserted into the receptacle 12 so that the components are more clearly illustrated. As shown, the receptacle 12 has a front, back, top, bottom and sides defining a cavity for receiving the module. On the bottom side, the receptacle 12 includes an inclined leading edge 30 and a latch tab 26 defining an opening 22. During insertion of the module 10 into the receptacle 12, the leading edge 30 rides over an outwardly extending latching member 32 on a first side 34 of the module 10, causing the latch tab 26 to be resiliently deflected until the latching member 32 is positioned to enter the opening 22 of the latch tab 26, at which time the latch tab 26 resiles, or snaps back, and latches the module 10 to the receptacle 12. The latching member 32 and the opening 22 are sized and shaped to mate closely, thus preventing movement of the module 10 within the receptacle 12. The module 10 remains latched to the receptacle 12 until the latch tab 26 is displaced to release the latching member 32, at which time the module 10 is de-latched from the receptacle 12 and can be easily withdrawn therefrom.

An exemplary de-latch mechanism is disclosed in U.S. Pat. No. 6,517,382 B2 and shown in FIG. 1A. This exemplary de-latch mechanism is illustrative of those known in the art in that it includes an actuator 50 that is slidably mounted in a slot 42 on a bottom side of the module 10, as shown in FIG. 1A. The actuator includes a ramped portion 54 for displacing the latch tab 26 when the actuator 50 is in an operative position, by causing it to be deflected until the latching member 32 is released from the latch tab 26.

To increase the number of modules per area, multiple SFP modules/receptacles are generally arranged in stacked rows and columns. In such stacked configurations, e.g. a belly-to belly configuration as shown in FIG. 1B, the de-latch mechanism is not readily accessible in that the actuator 50 is positioned between modules and/or behind the face (front) 11 of the module 10 when the actuator 50 is in both the operative and inoperative positions (see FIGS. 1A and 1B). Accordingly, a special tool or probe (not shown) must be inserted into the slot 42 on the module's face 11 and/or between adjacent modules to access and depress the actuator 50. The requirement of a tool for removing the module is not only inconvenient, but also prevents an operator from removing a module if he or she does not have a suitable tool at the appropriate time. This requirement of a tool results in increased installation cost and/or repair time.

Furthermore, operation of conventional push-button or other slide-actuatable de-latch mechanisms is complicated by the need to apply force for actuating the de-latch mechanism in a direction that opposes a direction in which force must be applied to withdraw the module from the receptacle. More specifically, such mechanisms require a user to push rearwardly on the actuator to actuate and to pull forwardly on the module to withdraw it from the receptacle. This can lessen the effectiveness of module ejection mechanisms, which are typically spring-biased. See U.S. Pat. No. 6,517,382 B2.

Accordingly, there is a need for a pluggable module having a de-latch mechanism that is easily accessible to an operator and does not require any tools to operate, and does not require the user to apply force for actuating the de-latch mechanism in a direction opposing force required to withdraw the module from its receptacle.

SUMMARY OF THE INVENTION

The present invention provides a lever-style de-latch mechanism for a pluggable electronic module, such as an SFP MSA fiber optic transceiver module, that fulfills these needs, among others, using a pivotable lever.

In one embodiment, the lever-style de-latch mechanism uses rotational motion of a lever about a horizontal axis transverse to a horizontal direction of elongation of a module to cause translational motion of the de-latch actuator. Mechanisms including both T and bail latch style levers are provided. The lever is positioned adjacent the front/face of the module's housing for tool-free accessibility and operation.

In another embodiment, the lever-style de-latch mechanism uses rotational motion of a lever about a vertical axis (relative to a module extending in a horizontal plane) to cause translational motion of the de-latch actuator. The lever is positioned to extend beyond the face of the housing for tool-free accessibility and operation. The mechanism is configured so that the user can apply force in a side-to-side direction to actuate the de-latch mechanism, and in a back-to-front direction to withdraw the module from its receptacle. Accordingly, the user-applied force is not applied in a direction opposing a withdrawal and/or module ejection force.

Modules and module assemblies including such a de-latch mechanism are also provided.

BRIEF DESCRIPTION OF THE DRAWINGS

The present invention will now be described by way of example with reference to the following drawings in which:

FIG. 2 is an exploded perspective view of an exemplary pluggable module in accordance with the present invention;

FIGS. 3A–3C and 4 are perspective views of an alternative embodiment of the module of FIG. 2;

FIGS. 5 and 6 are perspective views of an exemplary pluggable module in accordance with an alternative embodiment of the present invention;

FIGS. 9A–9C are cross-sectional views of the module of FIGS. 8A–8C;

FIGS. 11, 12, 13A and 13B are perspective views of an exemplary pluggable module in accordance with the present invention.

DETAILED DESCRIPTION

The present invention provides a lever-style de-latch mechanism that uses rotational motion of a lever to cause translational motion of the de-latch actuator. The de-latch mechanism is of a type suitable for SFP MSA optoelectronic transceiver modules or any other type of pluggable electronic module. The present invention is discussed below with reference to an SFP MSA optoelectronic transceiver module for illustrative purposes. Certain embodiment(s) that use rotational motion of a lever about a horizontal axis perpendicular to a horizontal direction of elongation of a module are discussed with reference to FIGS. 2–10. Other embodiment(s) that use rotational motion of a lever about a vertical axis (relative to a module extending in a horizontal plane) are discussed with reference to FIGS. 11–14.

Figure 1A:
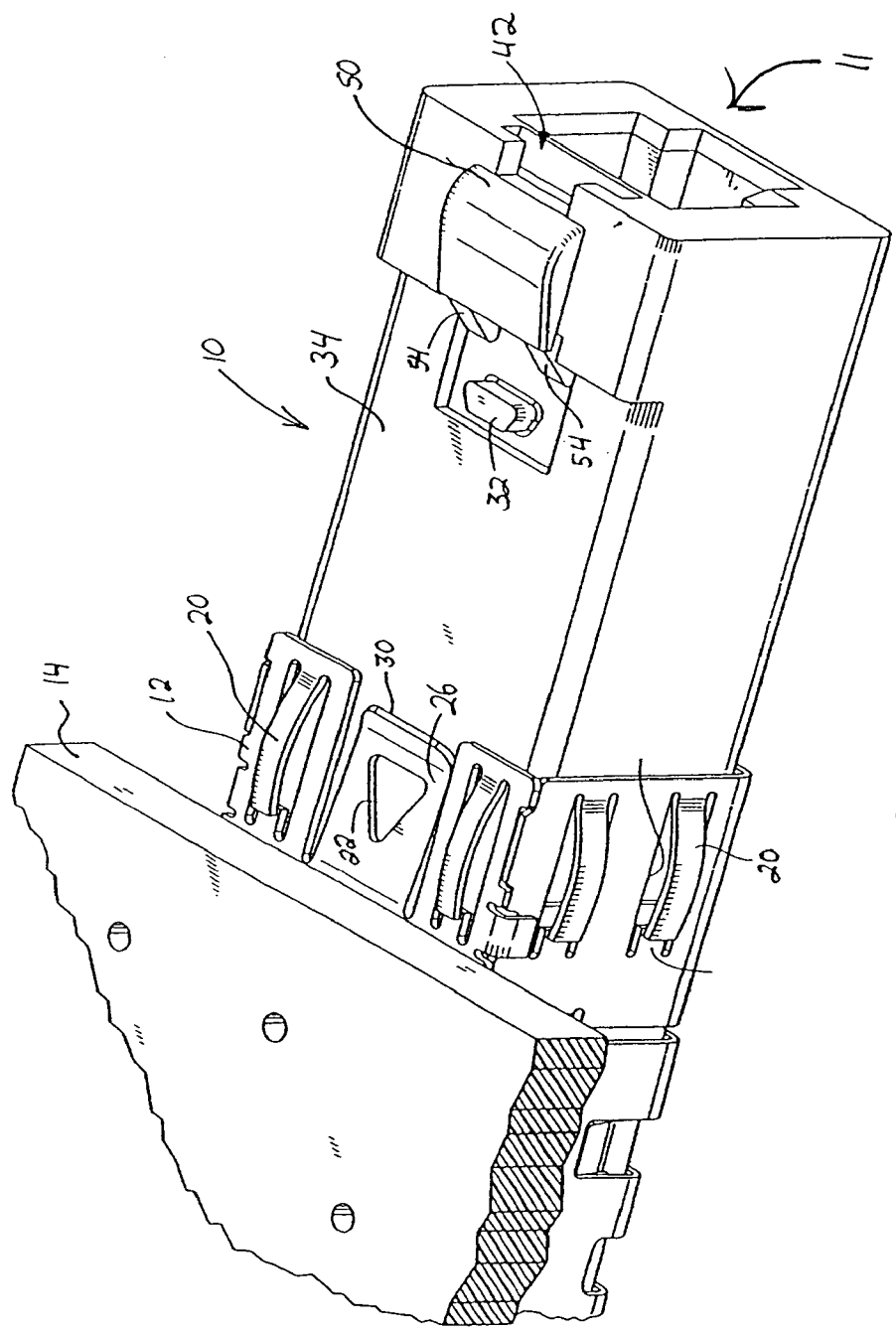
FIGS. 1A and 1B are perspective views of an exemplary transceiver module and receptacle.
Figure 1B:
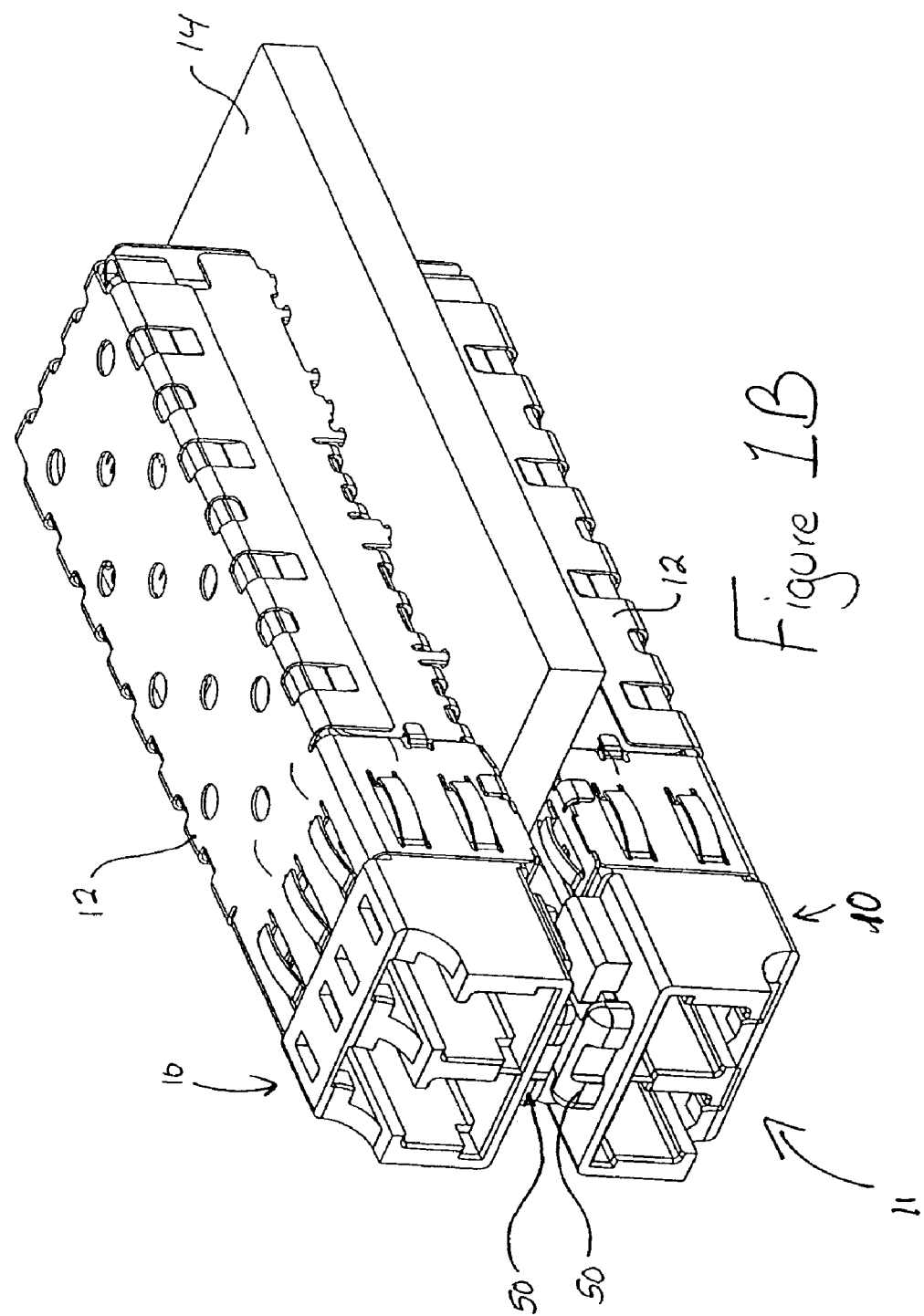
Figure 3B:
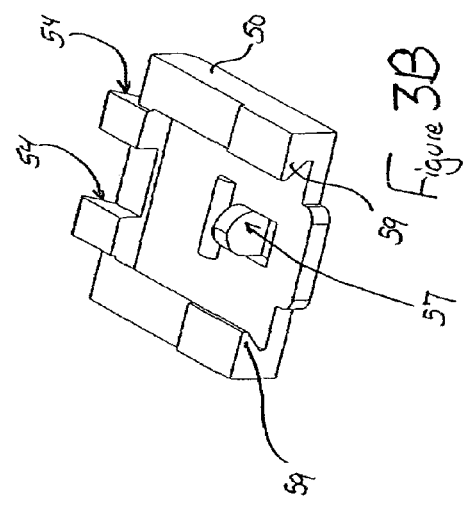
Figure 3A:
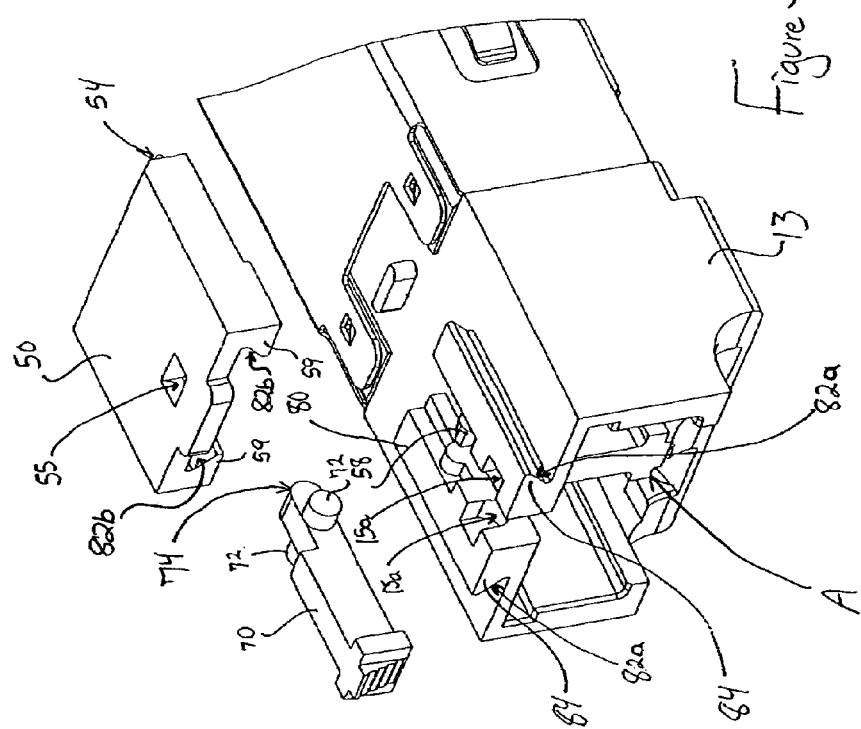
Figure 4:
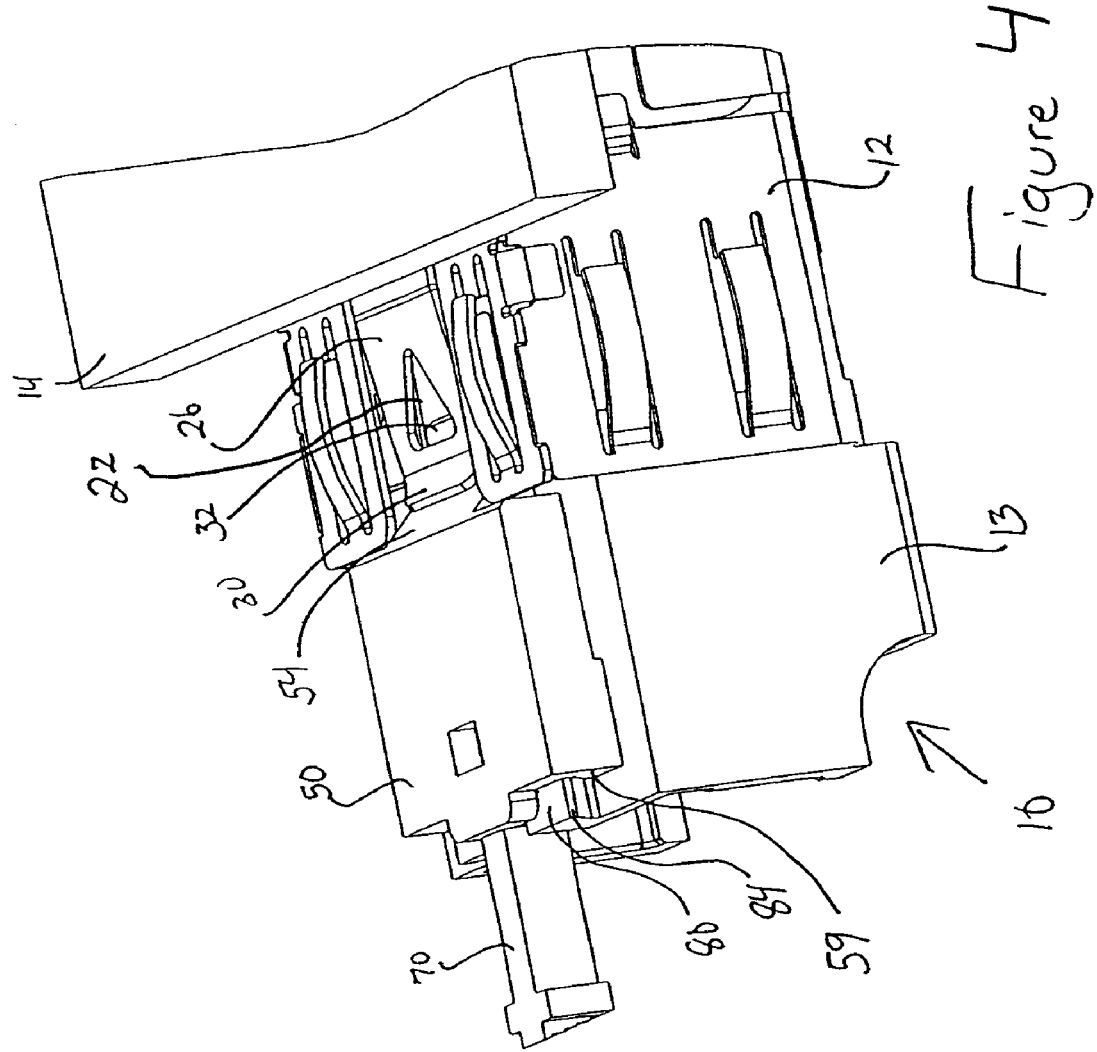

As shown in FIG. 2, the module 10 includes, in relevant part, a housing 13 having a face 11, a side 34 transverse to the face 11, and a latching member 32 extending from the side 34 that is sized to mate with an opening 22 of a latch tab 26 of the receptacle 12 for receiving the module 10 (see FIG. 4). Referring now to FIGS. 2–4, two embodiments are shown that employ a pivotable T-lever 70 and a slidable actuator 50. Specifically, FIG. 2 shows a housing 13 having a latching member 32 for mating with a receptacle (not shown) having a latch tab (not shown). The housing 13 includes a mounting bracket 15 having bearing surfaces 15a on the bottom side 34 adjacent the face 11 of the module 10. The mounting bracket 15 is positioned centrally to the sides of the housing 13/module 10, as shown in FIG. 2. The bearing surfaces 15a are dimensioned to receive a pivot pin 72 of the lever 70. The housing 13 includes L-shaped ribs 43 defining a slot 42 dimensioned to slidably receive a plate-like slider 62 having upwardly extending bosses 64. The actuator 50 has wedges 54 for displacing a latch tab (not shown), and openings 55 dimensioned to receive the bosses 64 of the slider 62. The actuator 50 can thereby be mounted to the slider 62 by adhesive, bolts, screws, interference fit, etc., such that the actuator 50 is slidably mounted to the housing 13 for translational motion relative thereto for de-latching the module 10.

A lever 70 is provided with outwardly extending pivot posts 72 sharing a common axis. Preferably, the lever 70 is die cast of a suitable high strength material, and the actuator is made of a suitable plastic material. The actuator 50 has complementary bearing surfaces 53 that cooperate with the bearing surfaces 15a of the housing 13 to cooperate therewith to pivotably support and retain the lever 70. Additionally, the actuator 50 is provided with a cam surface 57 (see FIG. 3B). The housing 13 and T-lever 70 are preferably complementarily shaped such that the T-lever 70 and housing 13 combined retain a similar overall shape and dimension when in the 0 degree, inoperative position, as best shown at A in FIGS. 3A and 3C. In this manner, the overall external dimensions of the SFP module are not exceeded, and the input ports of the module remain unobstructed.

A cam surface 74 is provided adjacent an end of the T-lever 70. Preferably, the cam surface is contoured to have a smooth curve to decrease wear on surfaces impinged upon by the cam surface. It should be noted that the bearing surfaces 15a, 53 are oriented to permit rotational motion of the T-lever 70 about a horizontal axis X perpendicular to a horizontal direction of elongation Y of the module 10. In this manner, pivotal motion of the T-lever causes movement of the cam surface 74 toward the latching member 32, and corresponding displacement of the actuator 50 towards the latching member 32 as the cam surface 74 of the T-lever 70 rides against the cam surface 57 of the actuator 50. The T-lever 70 and actuator 50 are preferably configured such that a rotation of approximately 90 degrees causes sufficient longitudinal displacement of the actuator 50 that the wedges 54 displace the latch tab 26 sufficiently for releasing the latching member 32 from the latch tab at approximately the 90 degree (operative) position.

The embodiment of FIGS. 3A–3C and 4 is similar to the embodiment of FIG. 2 in that pivoting of a T-lever 70 causes translational motion of the actuator 50 to disengage the latch tab 26 from the latching member 32. However, in the alternative embodiment of FIGS. 3A–3C and 4, a one-piece actuator 50 is provided. The housing 13 is provided with a mounting boss 80 having reentrant surfaces 82a defining guide rails 84. The actuator 50 has complementary latch tabs 59 defining complementary reentrant surfaces 82b. In this manner, the actuator 50 can be slid onto the mounting boss 80 of the module 10 and be slidably retained thereon. As the actuator 50 is slid toward the front of the housing, the cam surface 57 engages the ramp 58, causing a resilient deflection of the actuator 50 until the cam surface 57 seats in pocket 55, as best shown in FIGS. 3A and 3B. The actuator 50 has a cam surface 57 so that pivotal motion of the T-lever 70 through an arc of approximately 90 degrees causes movement of the cam surface 74 toward the latching member 32, and corresponding displacement of the actuator 50 towards the latching member 32 as shown in FIG. 4.

In FIGS. 5–6 and 7A–9C, alternative embodiments are shown in which rotational motion of a lever about a horizontal axis X perpendicular to a horizontal direction of elongation of a module Y is used to cause translational motion of an actuator to de-latch the module from its receptacle. Referring now to FIGS. 5 and 6, the housing 13 has a latching member 32 for mating with a receptacle 12 having a latch tab 26. The housing 13 includes mounting brackets 15 defining bearing surfaces 15a on the bottom side 34 adjacent the face 11 of the module 10. The bearing surfaces 15a are dimensioned to receive and retain the pivot pin in a snap fit. The bearing surfaces 15a define a channel for receiving a bail latch 90, as discussed below. The channel extends along a horizontal axis X perpendicular to a horizontal direction of elongation Y of the module 10. The housing 13 includes L-shaped ribs 43 defining a slot dimensioned to slidably receive an actuator 50 having wedges 54a, 54b for displacing the latch tab 26 to release the latching member, as discussed above. In the exemplary embodiment, the actuator 50 includes a stop 59 that butts up against the ribs 43 to provide a predetermined stopping position for the actuator 50 when it is advanced toward the latch tab 26. This limits the range of motion of the actuator 50 to prevent damage to the latch tab 26 of the receptacle 12. Accordingly, the actuator 50 is slidably retained on the housing 12.

The bail latch 90 is generally U-shaped with a pivot pin 92 connecting the ends of the U-shaped bail latch 90. Preferably, the bail latch 90 is die cast of a suitable metal, and the actuator is made of a suitable plastic material. The pivot pin 92 is received in the channel defined by the bearing surfaces 15a to pivotally attach the bail latch 90 to the housing 13. In this embodiment, the pivot pin 92 and/or mounting bracket 15 are to be received in the bearing surfaces 15a and retained on the housing 13 by a snap/friction fit. The de-latch mechanism can be assembled by sliding the actuator 50 into the slot between the ribs 43 and then snapping the pivot pin 92 of the bail latch 90 into the mounting brackets 15.

A cam 94 having a cam surface 74 is provided on the pivot pin 92. Preferably, the cam surface 74 is contoured to have a smooth curve to decrease wear on surfaces impinged upon by the cam surface.

The housing 13 and bail latch 90 are preferably complementarily shaped such that the bail latch 90 and housing 13 combined retain a similar overall shape and dimension when in the 0 degree, inoperative position, as best shown in FIG. 5. In this manner, the overall external dimensions of an SFP module are not exceeded, and the input ports of the module remain unobstructed.

Accordingly, the bail latch 90 is pivotally retained on the housing 13 such that pivotal motion of the bail latch 90 from the 0 degree position causes the cam 94 and cam surface 74 of the pivot pin 92 to impinge against the actuator 50, causing translational motion of the actuator 50 to de-latch the module 10 (by lifting the latch tab 26 to release the latching member 32) as the bail latch 90 is rotated to the operative position (preferably an approximately 90 degree position), as best shown in FIG. 6.

The alternative embodiment of FIGS. 7A–9C is similar in principle to that of FIGS. 5–6. However, in this embodiment, the housing 13 does not include ribs 43 for slidably holding the actuator 50. Instead, a cover 96 is provided that is attached to the housing 13 to slidably retain the actuator 50 on the housing 13. Optionally, the housing 13 may omit the mounting brackets/bearing surfaces as well, and the cover 96 may be provided with bearing surfaces for pivotally retaining the bail latch 90.

Figure 7B:
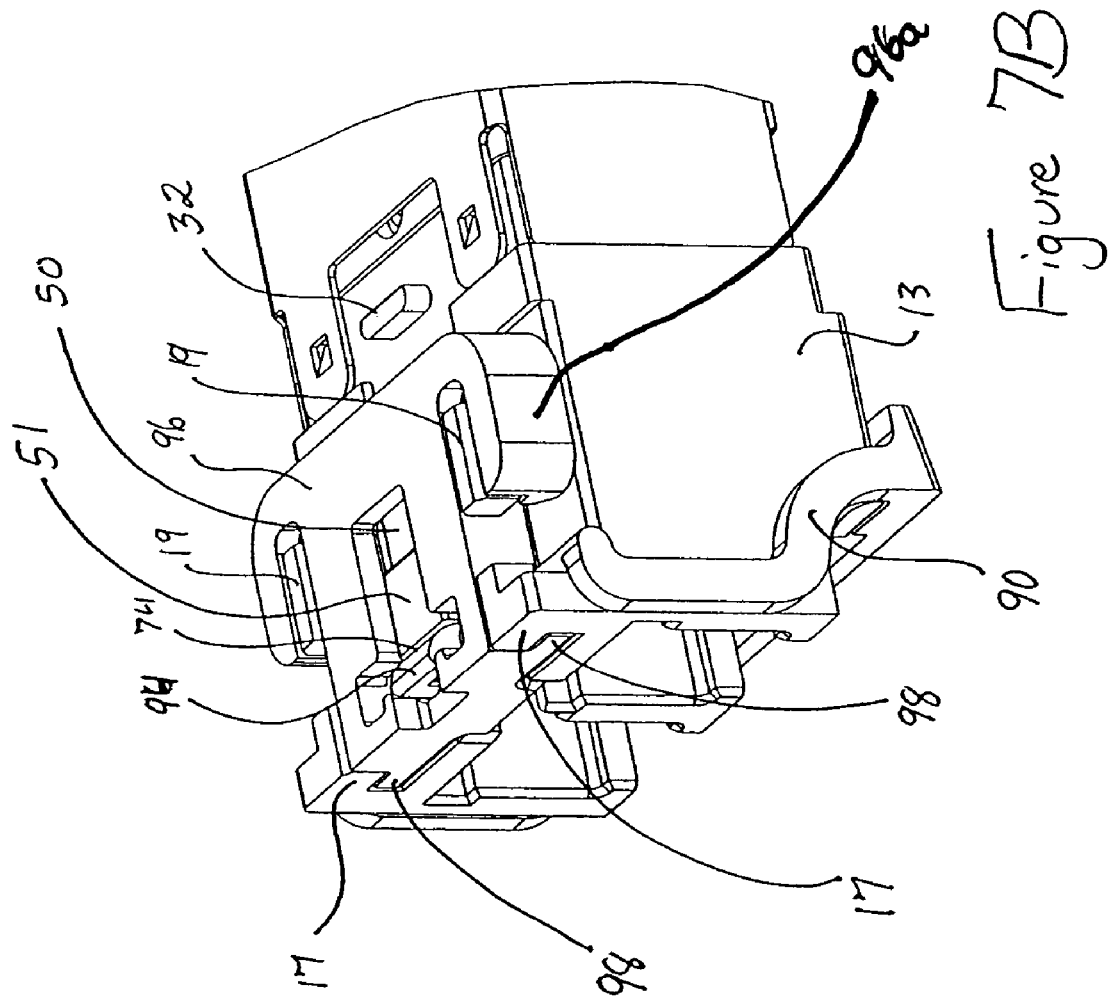
FIG. 7A–8C are perspective views of an alternative embodiment of the module of FIGS. 5 and 6.

The cover 96 may be attached to the housing in any suitable manner, e.g. snap fit, adhesive, mechanical fasteners, etc. In the exemplary embodiment of FIGS. 7A and 7B, the cover 96 and housing 13 are configured to permit a snap fit to secure the cover 96 to the housing 13 in an easy, tool free assembly process. Specifically, the cover 96 is provided with outwardly extending legs 98 that are received by retaining lips 17 of the housing 13. Additionally, latch tabs 19 are provided on the housing 13, and catch tabs 96a are provided on the cover 96 that deflect and resile to cooperate with the latch tabs 19 to hold the cover 96 on the housing as the cover 96 is pressed against the housing 13, as best shown in FIGS. 7A and 7B. This configuration is provided as an illustrative example only, and any suitable configuration may be used.

In the exemplary embodiment of FIGS. 7A–7B, the actuator 50 includes a guide post 51 for riding in a channel 99 of the cover 96 to resist twisting of the actuator 50 while promoting smooth longitudinal motion of the actuator 50, as best shown in FIGS. 7A and 7B. Additionally, the guide post 51 includes a stop surface 59 that butts up against a stop surface 97 of the cover 96 to provide a predetermined stopping position for the actuator 50. This limits the range of motion of the actuator 50 to prevent damage to the latch tab of the receptacle.

Figure 8B:
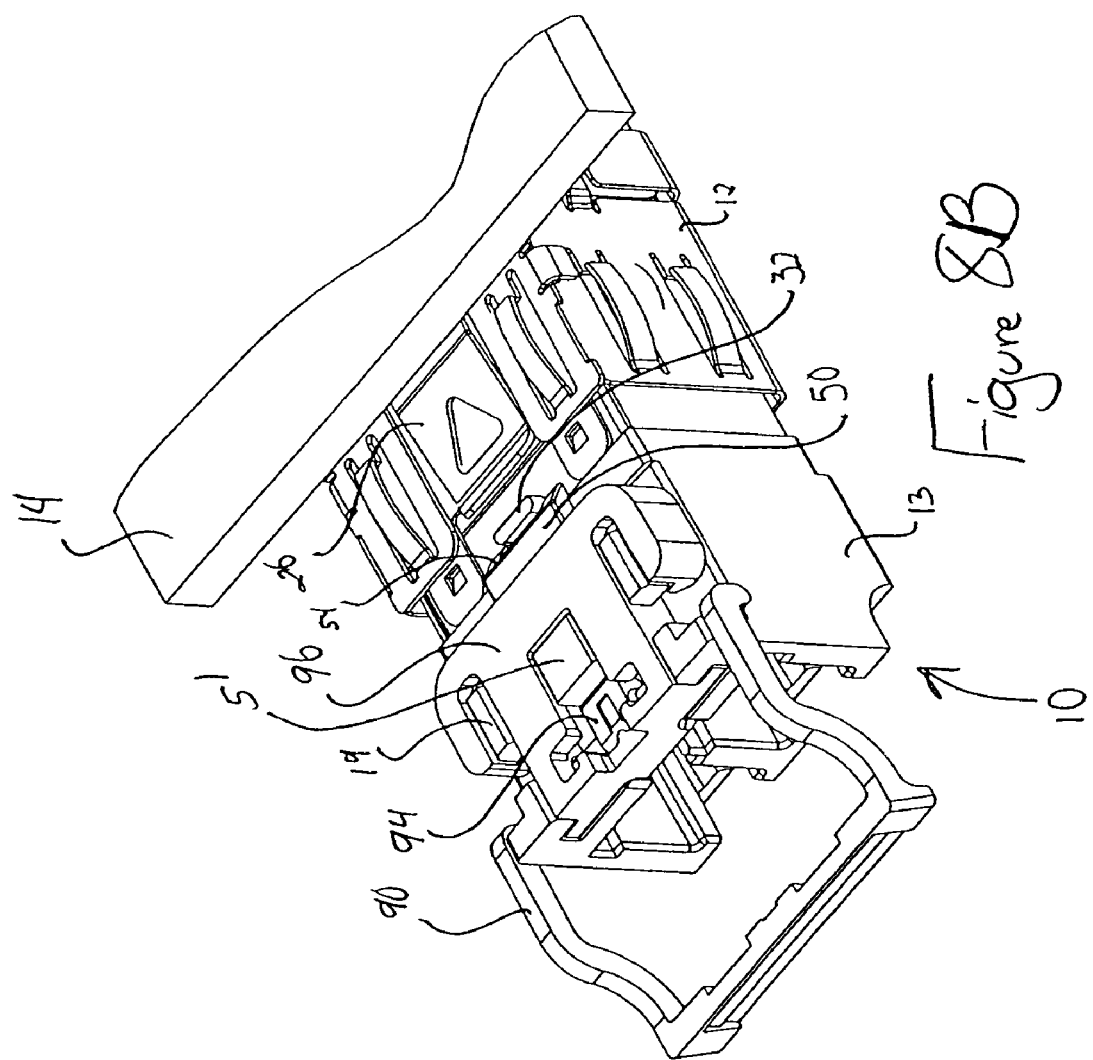

FIGS. 8A and 8B illustrate operation of the bail latch 90 of the module of FIGS. 7A and 7B, as it is pivoted about a horizontal axis X perpendicular to a horizontal direction of elongation Y of the module 10, to cause sufficient translational motion of the actuator 50 to de-latch the module 10 from a receptacle (by lifting the latch tab 26 to release the latching member 32) as the bail latch 90 is rotated to the operative position (preferably an approximately 90 degree position), as best shown in FIG. 8B.

Figure 8C:
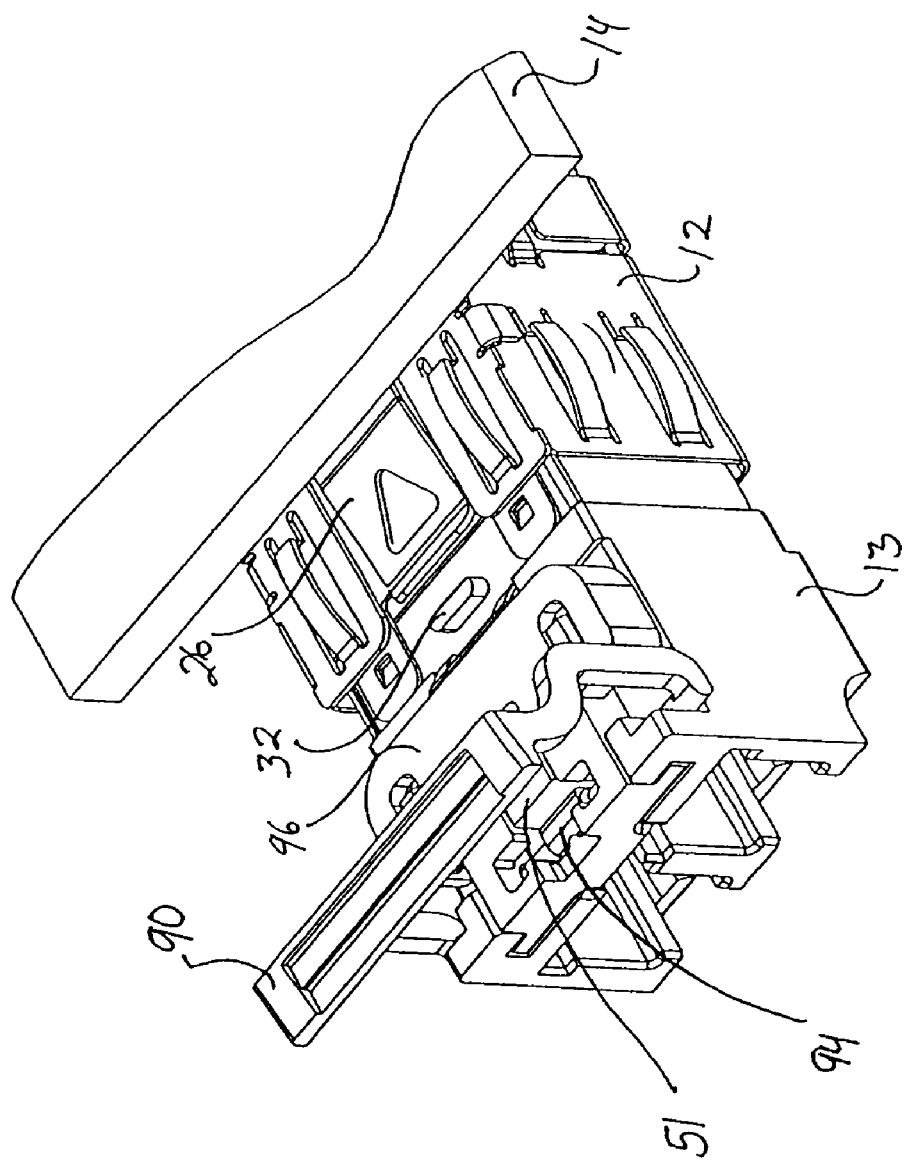
Figure 9A:
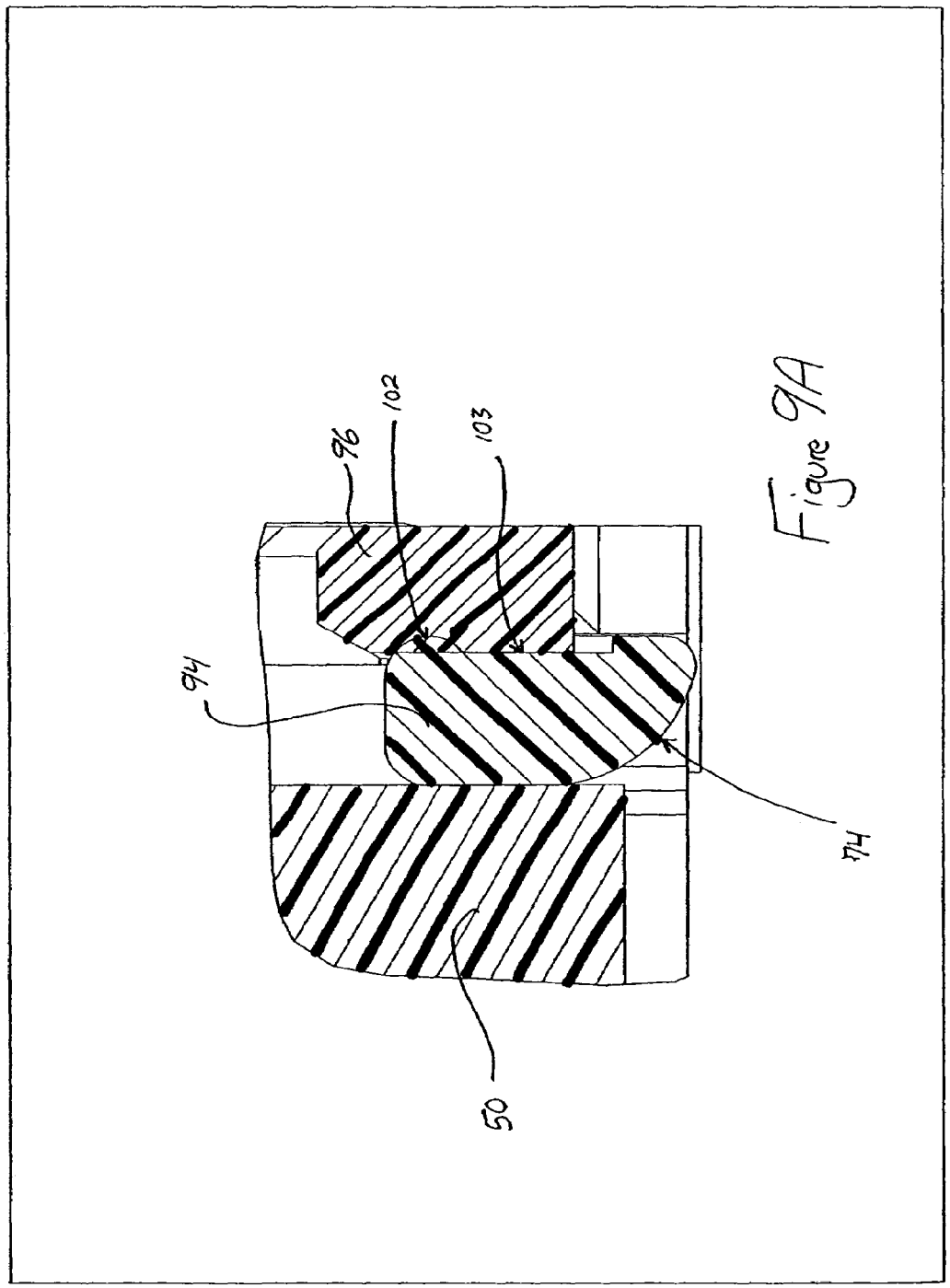
Figure 9B:
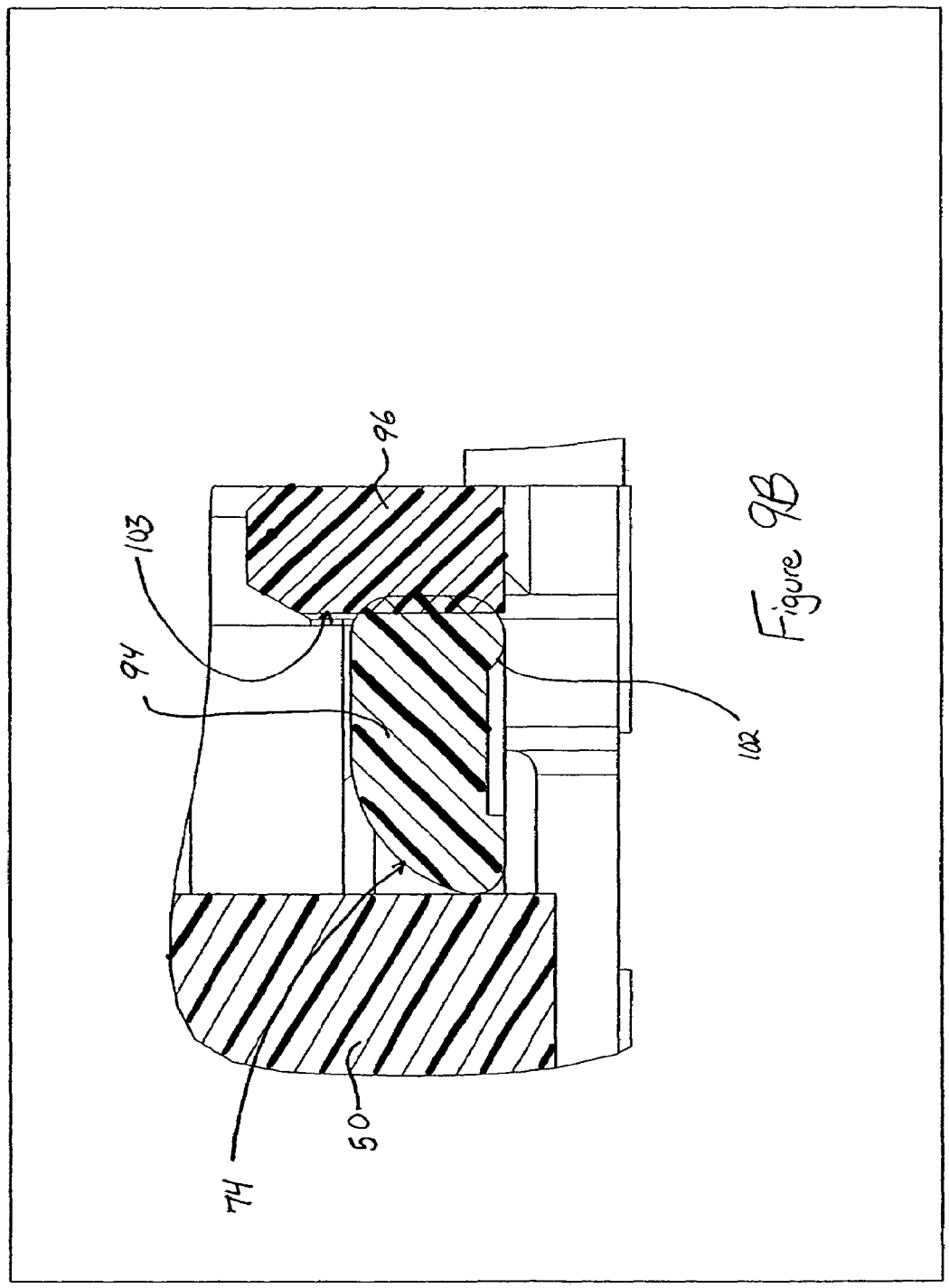

As illustrated in FIG. 8C, when the housing 13 is provided with a clearance notch 21 (see FIG. 7A), the bail latch 90 may be pivotable beyond the 90 degree position (e.g. to an approximately 180 degree position). In such a position, the cam 94 is received in the clearance notch 21, thereby permitting rotation beyond the 90 degree position. Depending upon the profile of the cam surface 74, the 180 degree position may cause the actuator to be in an inoperative position (allowing the latch tab to resile to retain the latching member), as shown in FIG. 8C, or in an operative position (for lifting the latch tab) (not shown). It may be preferable to allow the latch tab to resile when the bail latch 90 is in the 180 degree position so that the bail latch can be pivoted upwardly, moving the actuator 50 and allowing removal of the module 10. This prevents the module 10 from being trapped in the receptacle 12 if the module 10 is engaged when the bail latch 90 is in the 180 degree position of FIG. 8C. FIGS. 9A–9C are cross-sectional views of the modules of FIGS. 8A–8C, respectively, showing interference of the cover detent surface 103 with the bail boss 102 in the 0, 90 and 180 degree positions. As will be appreciated from FIGS. 8–8C, such interference causes the bail latch 90 to remain tight against the housing 13 in the home (0 degree) position (FIG. 8A), and to remain fixed in the 90 degree position (FIG. 8B) until a small amount of force is applied in either the upward or downward direction, and to remain fixed in the 180 degree position (FIG. 8C) until a force is applied to pivot the bail 90 toward the face 11 of the housing 13.

In use, once a module 10 is latched to a receptacle 12, the de-latch mechanisms of the present invention may be used to de-latch the module 10 from the receptacle 12 by pivoting a lever 90 vertically (from an upper to a lower position or vice versa). This causes translational motion of the actuator 50 to displace the latch tab 26 of the receptacle 12 to a point at which it releases a corresponding latching member 32 of the module 10. In this manner, the module is de-latched and may be easily withdrawn from the receptacle 12. It will be appreciated that no special tools are required to operate the de-latch mechanisms of the present invention, and that the relevant operative portions of the de-latch mechanisms are readily accessible at a front/face of the module, for easy access even when modules are stacked in a belly-to-belly or other stacked configuration.

Figure 10:
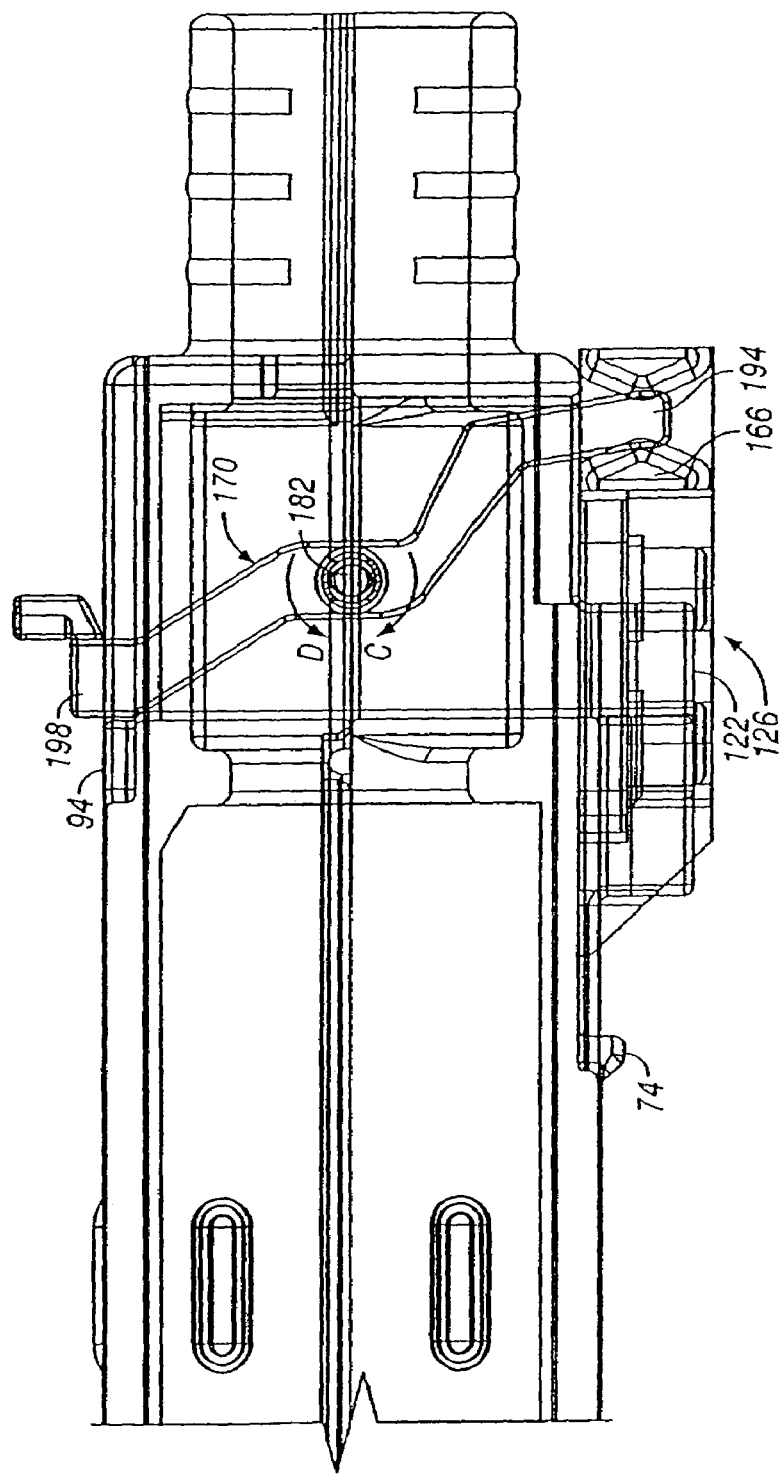
FIG. 10 is a partial side cutaway view of a connector module according to another alternative embodiment of the present invention.
Figure 111:
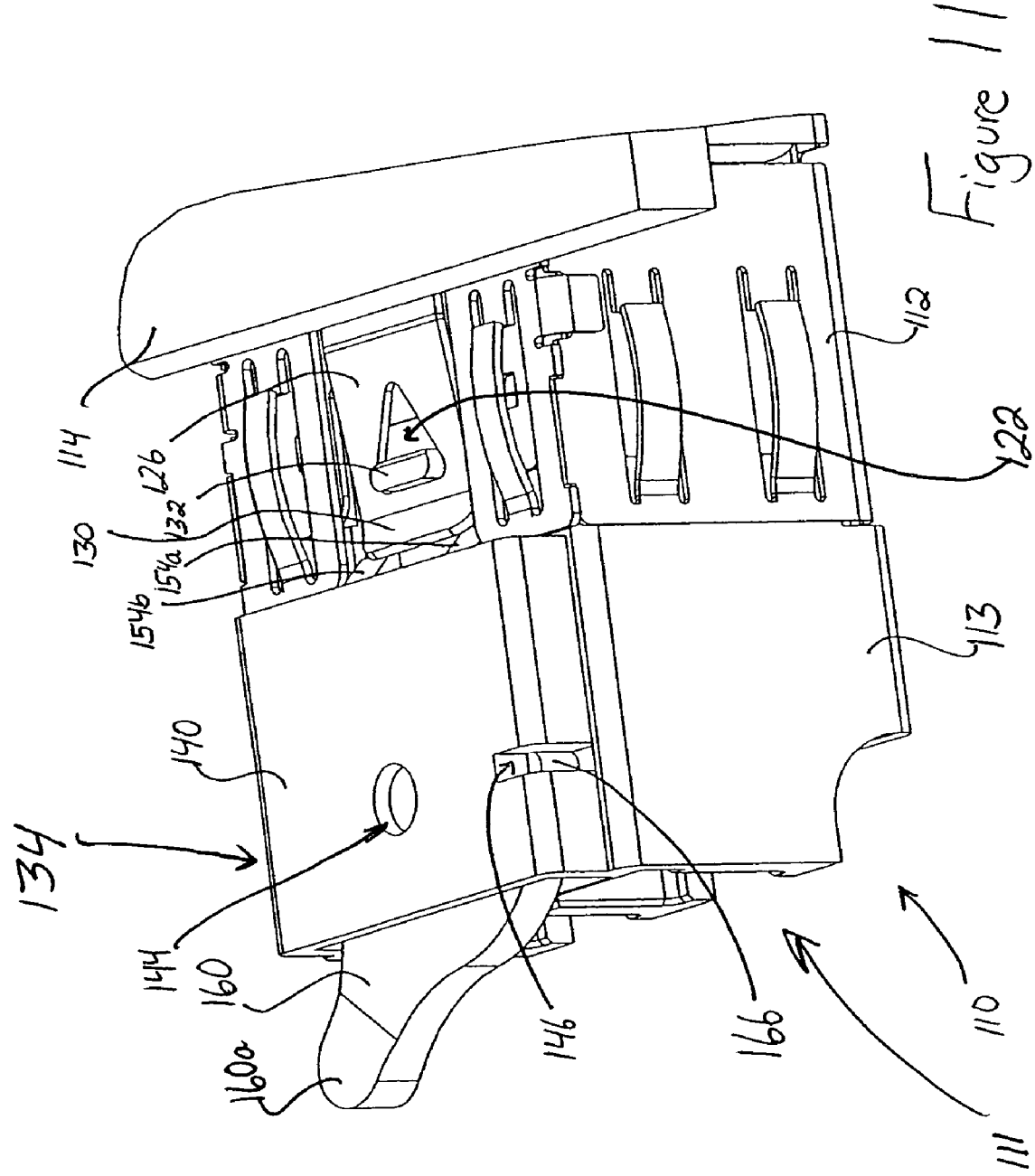

FIG. 10 illustrates a partial side cutaway view of an SFP connector module 10 having a housing carrying contacts at a lead end that are configured to be inserted into a receptacle/cage. The housing has a rear end configured to be connected to a cable. The housing has a wall with a module latch formed thereon. The module latch is configured to engage a cage latch on a connector cage/receptacle. The module also includes a lever beam slidably mounted to the wall of the housing. The lever beam is movable to a position proximate the module latch to release the module latch from the cage latch. The module also includes a lever arm rotatably mounted to the housing. The lever arm drives the lever beam to the position proximate the module latch when the lever arm is rotated. Specifically, force applied to the lever arm to actuate the de-latch mechanism is applied in a direction that does not oppose the direction of withdrawal of the module from a cage/receptacle. With reference to FIG. 10, the module 10 has driver arms 194 retaining a ramp beam 126 away from a locking tab 774. The lever beam 170 is thus in a locked forward position. A crossbeam 198 engages an edge of the top wall 94, which prevents the lever beam 170 from rotating any further in the direction of arrow D. Thus, the driver arms 194 engage the first cam ears 166 to prevent the ramp beam 126 from sliding further in the direction of arrow B off the rail walls 122. To slide the ramp beam 126 toward the locking tab 74, an operator moves the crossbeam 198 of the lever beam 170 in the direction of arrow B such that the driver arms 194 rotate about the posts 182 in the direction of arrow C and push the first cam ears 166 in the direction of arrow A.

Referring now to the alternative embodiment(s) of FIGS. 11–14, when the module is sought to be released from the receptacle, force is not applied to the de-latch mechanism in a direction that opposes withdrawal of the module; instead, such force is applied in a direction transverse to the direction of withdrawal of the module. Accordingly, the de-latch mechanism is configured such that application of force to actuate the de-latch mechanism does not counteract force applied to withdraw the module from the receptacle, making withdrawal easier and more intuitive. As shown in FIG. 11, the module 110 includes, in relevant part, a housing 113 having a face 111, a side 134 transverse to the face 111, and a latching member 132 extending from the side 134 that is sized to mate with the opening 122 in the latch tab 126 of the receptacle 112 for receiving the module 110. The module 110 is provided with a hood 140, which may be integrally formed with the housing 113 or attached thereto by snap fit, adhesive, ultrasonic welding, etc. The hood 140 defines a slot 142 for permitting longitudinal motion of an actuator 150 having at least one wedge 154 for displacing a latch tab 126. Travel of the actuator 150 toward the latch tab 126 and latching member 132 is limited by stops 101a, 101b that butt up against the end of slot 142 (see FIG. 12).

Figure 12:
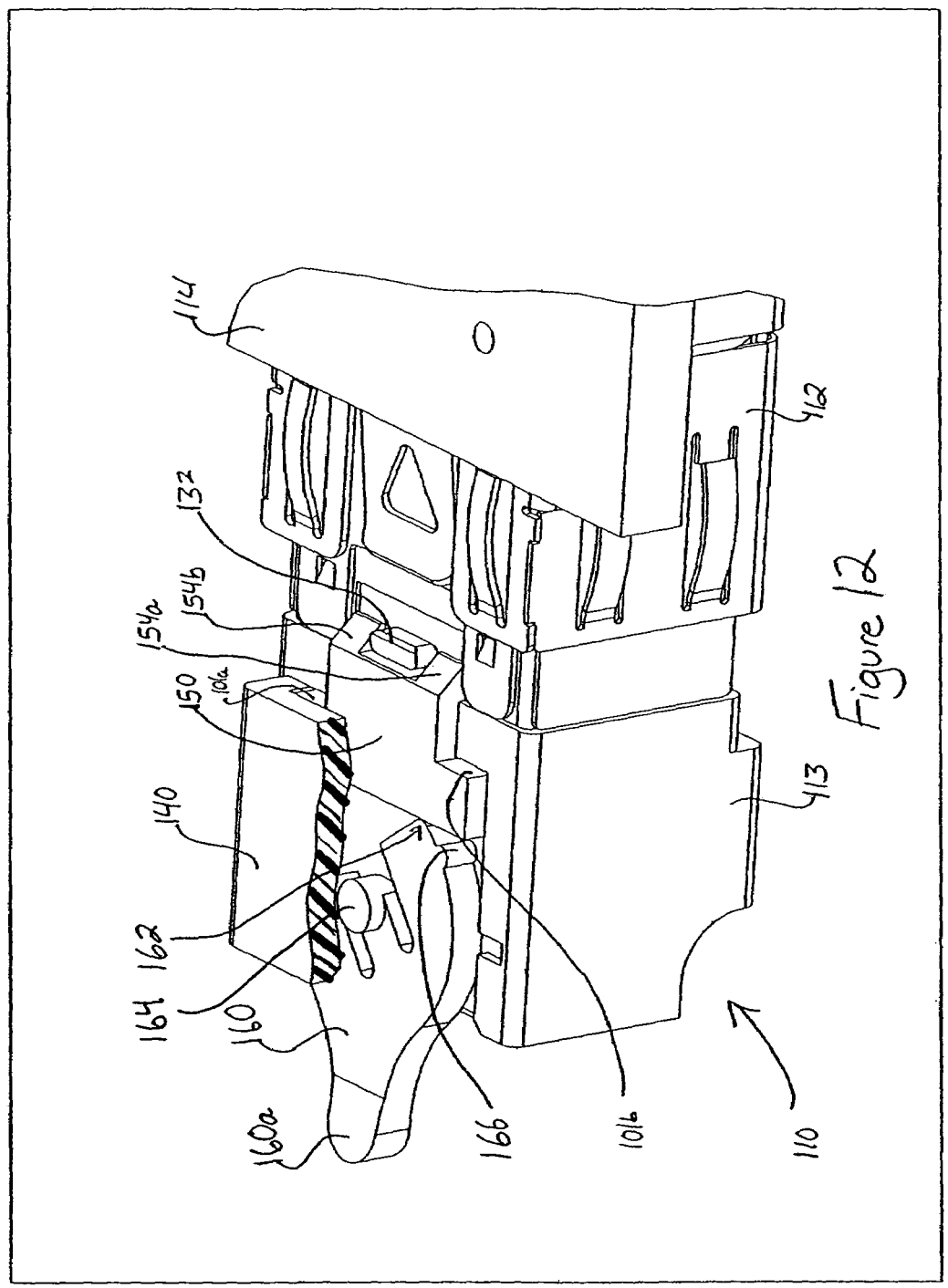

FIG. 12 shows the module of FIG. 11 with the lever 160 in an operative position such that the wedges 154 have displaced the latch tab 126 to release the latching member 132 therefrom, such that the module 110 can be withdrawn from the receptacle 112. FIGS. 13A and 13B show the interaction of the lever 160 and actuator 150 of FIG. 11 to cause longitudinal motion of the actuator 150 and displacement of the latch tab 126 upon rotational motion of the lever 160. It should be noted that FIGS. 12, 13A and 13B show the housing 113 with the hood 140 at least partially removed for illustrative purposes only.

Figure 13:
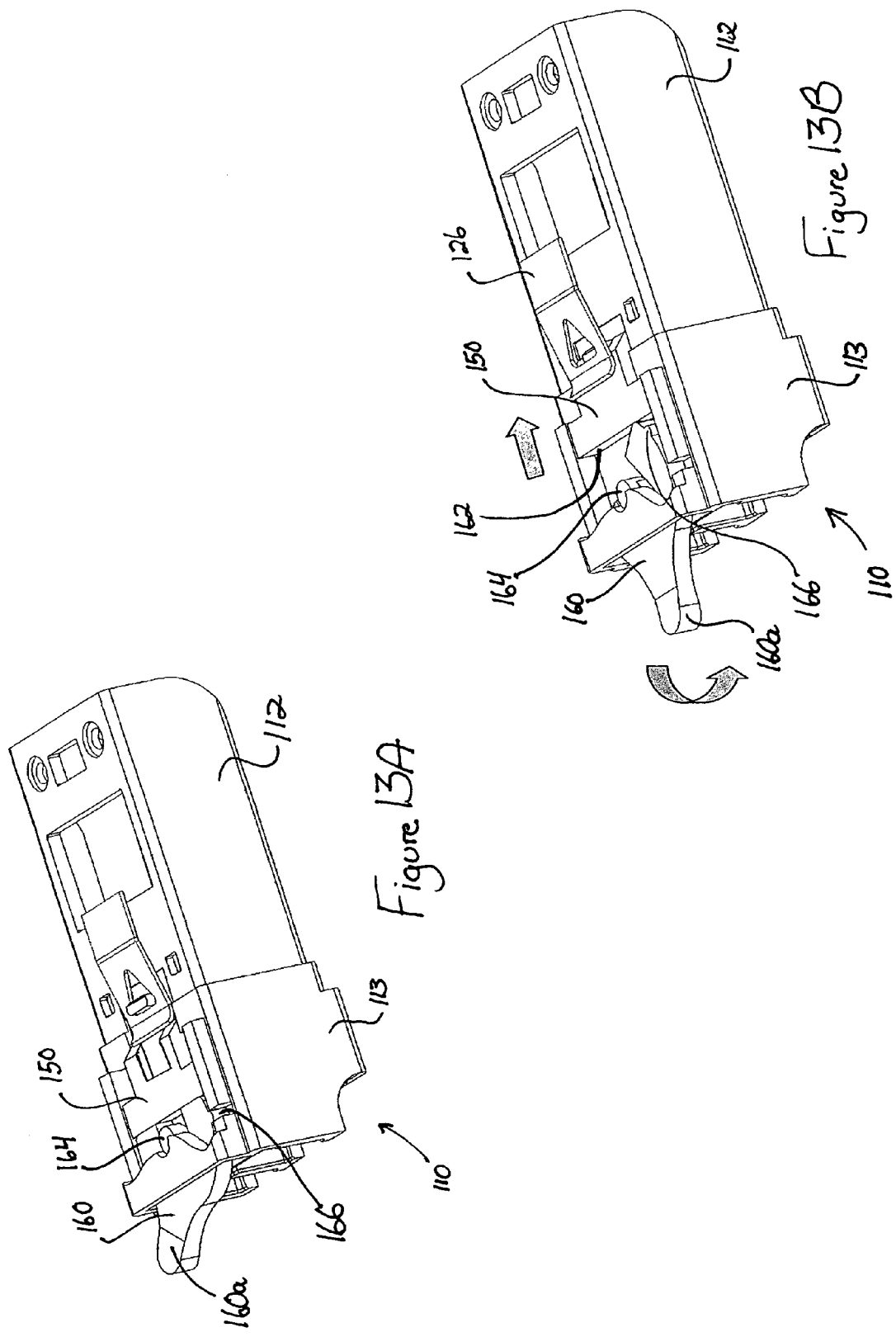
Figure 14:
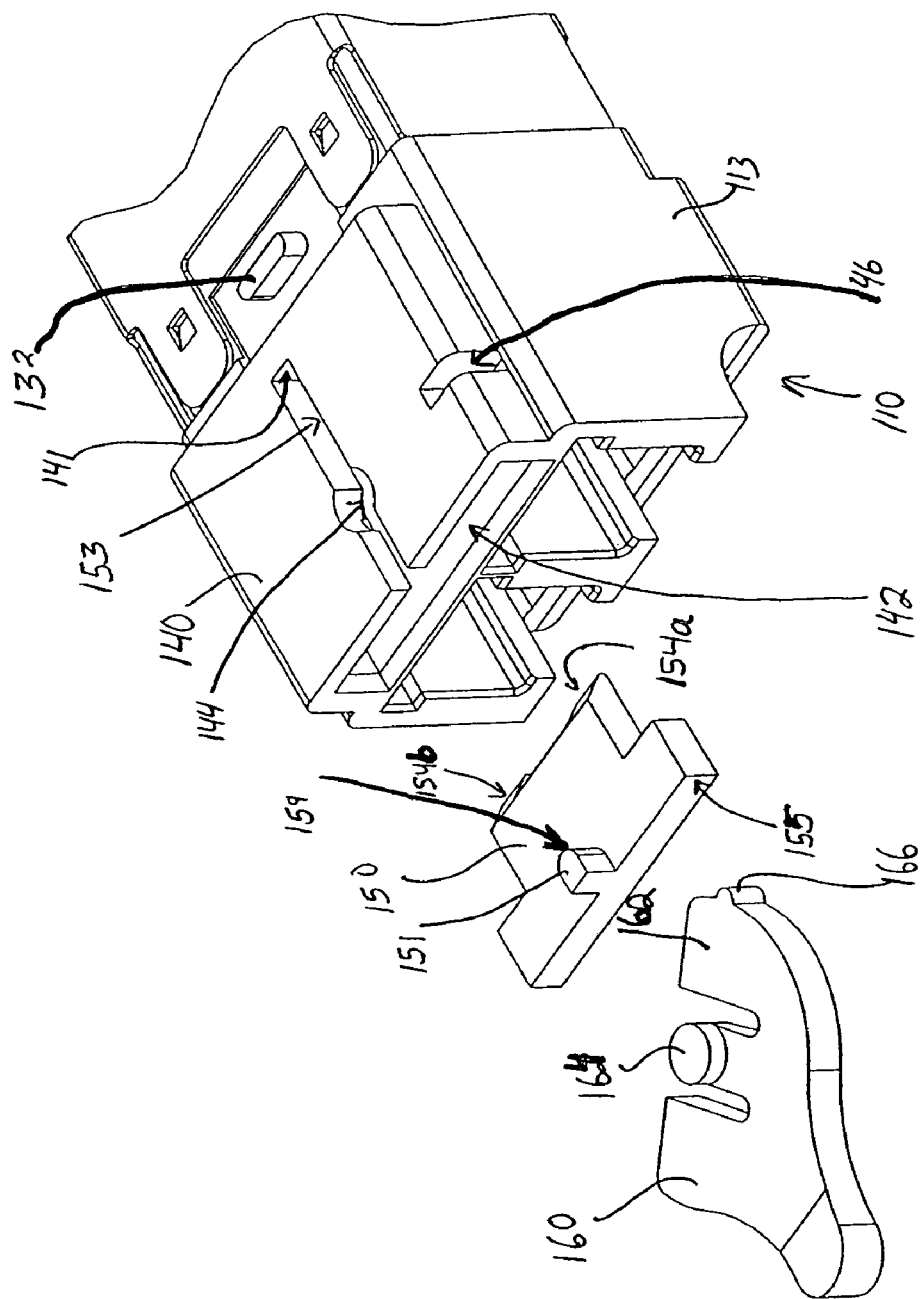
FIG. 14 is a perspective of an alternative embodiment of the module of FIGS. 11, 12, 13A and 13B.

FIG. 14 shows an alternative embodiment of the de-latch mechanism of FIGS. 11–13B. In this embodiment, the actuator 150 includes a guide post 151 for riding in a channel 153 of the hood 140 to resist twisting of the actuator 150 while promoting smooth longitudinal motion of the actuator 150. Additionally, the guide post 151 includes a stop surface 159 that butts up against a stop surface 41 of the housing 113/hood 140 to provide a predetermined stopping position for the actuator 150 when it is pressed. This limits the range of motion of the actuator 150 to prevent damage to the latch tab 126 of the receptacle 112.

In either of the embodiments of FIGS. 11 and 14, the de-latch mechanism includes a lever 160 that is pivotally mounted to the housing 113 to cause the lever 160 to impinge, i.e. press against, and move the slidable actuator 150 when moved toward an operative position, i.e. the position of FIGS. 12 and 13B. The lever 160 is mounted to the housing 113 to cause at least a portion of 160a of the lever 160 to extend beyond the face 111 of the housing 113 in at least the inoperable position (see FIG. 11) and preferably in both the inoperable (FIG. 11) and operable (FIG. 12) positions. In the exemplary embodiments of FIGS. 11 and 14, the lever 160 is provided with a pivot post 164 receivable in a socket 144 of the hood 140 to permit pivoting of the lever 160 relative to the module 110, as best shown in FIG. 12. For example, the lever 160 may be press fit into the hood 140 to cause resilient deflection of the pivot post 164 until the pivot post 164 seats in the socket 144, at which point the pivot post 164 resiles and the lever 160 is positively retained in place. The lever 160 includes a shoulder 162 acting as a cam surface that impinges upon an end 155 of the actuator 150 to cause translational motion thereof as the lever 160 is pivoted toward the operative position, as best shown in FIG. 12.

In the exemplary embodiments of FIGS. 11–14, the lever 160 includes a boss 166 and the housing 113/hood 140 includes a complementary recess 146 for receiving the boss 166 when the lever is in an inoperative position in which the lever is not causing sliding of the actuator, as shown in FIGS. 11 and 13A.

In use, once a module 110 is latched to a receptacle 112, the de-latch mechanisms of the present invention may be used to de-latch the module 110 from the receptacle 112 by pivoting a lever 160 horizontally (from one side to another). See FIGS. 11–14. This causes translational motion of the actuator 150 to displace the latch tab 126 of the receptacle 112 to a point at which it releases a corresponding latching member 132 of the module 110. In this manner, the module is de-latched and may be easily withdrawn from the receptacle 112. It will be appreciated that no special tools are required to operate the de-latch mechanisms of the present invention, and that the relevant operative portions of the de-latch mechanisms are readily accessible at a front/face of the module, for easy access even when modules are stacked in a belly-to-belly or other stacked configuration.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A de-latch mechanism for a pluggable module, the mechanism comprising:
   a housing having an outer surface;
   an actuator slidably mounted on said outer surface for translational movement in a linear direction along said outer surface, said actuator comprising a wedge having a surface inclined relative to said outer surface, said surface being inclined from a position adjacent said outer surface;
   a lever mounted to the housing and pivotable about a pivot pin having an axis transverse to the linear direction; and
   a cam provided adjacent said pivot pin, said cam having a curved cam surface;
   wherein pivoting of said lever about said pivot pin causes said cam surface to impinge upon said actuator to impart linear translation movement to said actuator's wedge relative to said outer surface of said housing.

2. The de-latch mechanism of claim 1, wherein said lever is T-shaped.

3. The de-latch mechanism of claim 2, wherein said housing has opposite sides, said lever being mounted centrally to said sides.

4. The de-latch mechanism of claim 1, wherein said lever is mounted to said housing, said housing comprising a mounting boss defining guide rails, said actuator comprising latch tabs defining complementary surfaces complementary to said guide rails for latching to the guide rails, said guide rails and said latch tabs cooperating to allow relative translational motion between said guide rails and said latch tabs.

5. The de-latch mechanism of claim 4, wherein said guide rails are defined by reentrant surfaces, and said latch tabs define complementary reentrant surfaces that are complementary to said reentrant surfaces for latching to said guide rails.

6. A pluggable module assembly comprising:
   a receptacle having a latch tab defining an opening; and
   a pluggable module having:
      a housing having a face and a side transverse to the face, the housing having a latching member that extends from the side and is sized for receipt in the opening in the latch tab, the housing defining a slot extending adjacent the latching member;
   an actuator slidably mounted in the slot on the side for translational movement in a linear direction along said side, said actuator comprising a wedge having a surface inclined relative to said outer surface, said surface being inclined from a position adjacent said outer surface;
      a lever pivotable about a pivot pin having an axis transverse to the I linear direction; and
      a cam provided adjacent said pivot pin, said cam having a curved cam surface;
   wherein pivoting of said lever about said axis causes said cam surface to impinge upon said actuator to impart linear translation movement to said actuator's wedge relative to said side of said housing to cause said latch tab to release said latch member.

* * * * *